US006542175B1

(12) United States Patent
Lentz (10) Patent No.: US 6,542,175 B1
(45) Date of Patent: Apr. 1, 2003

(54) COMPUTER CONTROLLED DISPLAY GRAPHICAL INTERFACE UNIT FOR TRACKING A SEQUENCE OF DOCUMENTS AND FOR CONTROLLING THE SIZE OF A CACHE FOR STORING THE DOCUMENTS

(75) Inventor: James Lee Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,529

(22) Filed: Feb. 17, 2000

(51) Int. Cl.[7] .............................................. G06F 15/00
(52) U.S. Cl. ...................................... 345/851; 345/833
(58) Field of Search ................................ 345/765, 744, 345/853, 854, 797, 804, 808, 851, 833

(56) References Cited

U.S. PATENT DOCUMENTS 6,138,155 A * 10/2000 Davis et al. ................. 709/224
6,144,375 A * 11/2000 Jain et al. .................... 345/302
6,211,877 B1 * 4/2001 Steele ......................... 345/857

* cited by examiner

*Primary Examiner*—Cao H. Nguyen
(74) *Attorney, Agent, or Firm*—J. B. Kraft; T. E. Tyson (57) ABSTRACT

A simplified graphical user interface display unit which enables the user to view and change cache size relative to received cached documents and also to enable the user to track a sequence of received documents or a sequence of other computer controlled events. A data processor controlled receiving display station for receiving Web documents has apparatus for storing a sequence of received Web documents, tracking the sequence cf stored Web documents in combination with a displayed graphical unit including: a sequence of nondescriptive markers corresponding to the sequence of stored Web documents and a user interactive implementation for stepping sequentially through the sequence of markers. The receiving display station has caching apparatus of variable size and the graphical unit further includes an interactive implementation for varying the cache size which includes a space for the sequence of markers proportional in size to the size of the cache, and the implementation to vary the cache size varies the size of the space for the sequence of markers.

33 Claims, 6 Drawing Sheets

COMPUTER CONTROLLED DISPLAY GRAPHICAL INTERFACE UNIT FOR TRACKING A SEQUENCE OF DOCUMENTS AND FOR CONTROLLING THE SIZE OF A CACHE FOR STORING THE DOCUMENTS

TECHNICAL FIELD

The present invention relates to computer controlled graphical user interfaces and particularly to ease of use interactive computer controlled display interfaces for tracking a sequence of data processor controlled events, such as tracking a sequence of Web documents received over the World Wide Web (Web) or Internet. More particularly, the invention relates to the tracking of received and cached Web documents or pages at a receiving display station through the graphical interface.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet related distribution of documents, media and programs. The convergence of the electronic entertainment and consumer industries with data processing exponentially accelerated the demand for wide ranging communications distribution channels and the Web or Internet (terms are used interchangeably), which had quietly existed for over a generation as a loose academic and government data distribution facility, reached "critical mass" and commenced a period of phenomenal expansion. With this expansion, businesses and consumers have direct access to all matter of Web documents, including media and computer programs. Web pages are now extensively used for commercial, academic and entertainment purposes.

In addition, because of the vast amount of information potentially available through networks such as the Internet, it is important that the presentation of the pages of a transmitted document be presented as quickly as possible on the display screen of the receiving display station and with as little effort as possible on the part of the receiving user. To this end, the Internet browser programs through which these users access the Internet are provided with caching capabilities at the receiving display station.

At this point, in order to better understand the factors associated with browsers and caching, a brief review of the current Internet background should be helpful. The most commonly used method of accessing and distributing data over the Internet is through the Web environment. In the Web environment, servers and clients conduct Web transactions using the Hypertext Transfer Protocol (HTTP), a common protocol for handling the transfer of various data files (e.g. text, still graphic images, audio, motion video, etc.), which may be included in Web documents. Information is formatted for transfer and presentation to a user by a standard page description language (Hypertext Markup Language (HTML)). Besides formatting, HTML allows developers to specify "hyperlinks" to other Web resources identified by a Uniform Resource Locator (URL). The URL defines a communication path to an Internet server containing information units known as Web pages. Web documents may be of any arbitrary size and may include text, graphics, media and computer programs. A Web document may include all files required to present the information requested by using the URL identifier. Retrieval from the Web is accomplished with the above-mentioned browser which is a HTML compatible application program for submitting requests for data through an URL submitted by the receiving or client display station. When such data is retrieved, the controlling Web browsers cache the documents or pages accessed at the receiving display station. Caching of pages permits the user to repeatedly view the information within a session without also repeatedly retrieving such information from the Web. The Web documents retrieved from the Internet are cached in the local memory at the receiving display station, usually in cache portions allocated in the local disk drive and in the local Random Access Memory (RAM). Most conventional Internet browsers have programming routines for evaluating incoming documents and allocating local disk drive storage and RAM for the document cache at the receiving display station. Such evaluations and allocations are based in part on the type and size of the files of data supporting the received documents. In addition, received files often contain control code indicative of cache size requirements which may be used by the browser to allocate disk drive storage and RAM portions for caching. However, all of these cache allocation procedures presuppose that the user, in setting up the browser, has set aside sufficient disk drive portions and RAM portions for such caches. For example, let us assume that the browser application using control information provided by an incoming Web page has determined that the document will require a cache having m megabytes of disk space and n megabytes of RAM. However, as it turns out, the user, in setting up the browser application, has set aside less that the n megabytes of RAM. The browser will attempt to load the document in the RAM cache, since there will be insufficient RAM cache available, the document will be loaded in the noncache portion of RAM.

Conventionally, many browser programs provide a customization option to specify the quantity of RAM and the quantity of disk drive storage that he wishes to set aside for cache. Since a major portion of Web users are relatively unsophisticated in computer arts, this presents difficulties to such users. Current Web browser programs have the user go through a sequence of "advanced options" dialogs in order to try to adjust the cache size to meet the demands of received Web documents involving drop down menus and dialog boxes which tend to further clutter and confuse already full graphical user interfaces.

SUMMARY OF THE PRESENT INVENTION

The present invention solves the cache size control problem by providing the user with a simplified graphical user interface displayed unit which can function, not only to provide the user with a simple means of viewing and changing cache sizes relative to received cached documents, but even further to enable the user to track a sequence of received documents or a sequence of other computer controlled events, e.g. event=any information accessed by the computer.

The present invention has implications beyond the tracking of received Web document caches. It is applicable to data processor controlled display systems with graphical user interfaces and provides means for tracking a sequence of data processor controlled events in combination with a displayed graphical unit including a sequence of nondescriptive markers corresponding to said sequence of events, and user interactive means for stepping sequentially through said sequence of markers. Means are provided for selecting one of said markers together with means responsive to these selecting means for displaying a description of the event represented by the marker. In this manner, the interface is not cluttered with descriptions or graphics for each event, e.g. Web document in the sequence but these descriptions may be pointed to and brought up as needed. In addition, the events themselves may be brought up and displayed as needed by such pointing means.

When applied to the caching of received Web documents, the invention provides a data processor controlled receiving display station for receiving Web documents including means for storing a sequence of received Web documents, means for tracking said sequence of stored Web documents in combination with a displayed graphical unit including: a sequence of nondescriptive markers corresponding to said sequence of stored Web documents and user interactive means for stepping sequentially through said sequence of markers.

For caching, the receiving display station has caching means of variable size and the graphical unit further includes interactive means for varying said cache size which includes a space for the sequence of markers, proportional in size to the size of said cache means, and the means for varying said cache size vary the size of the space for said sequence of markers.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
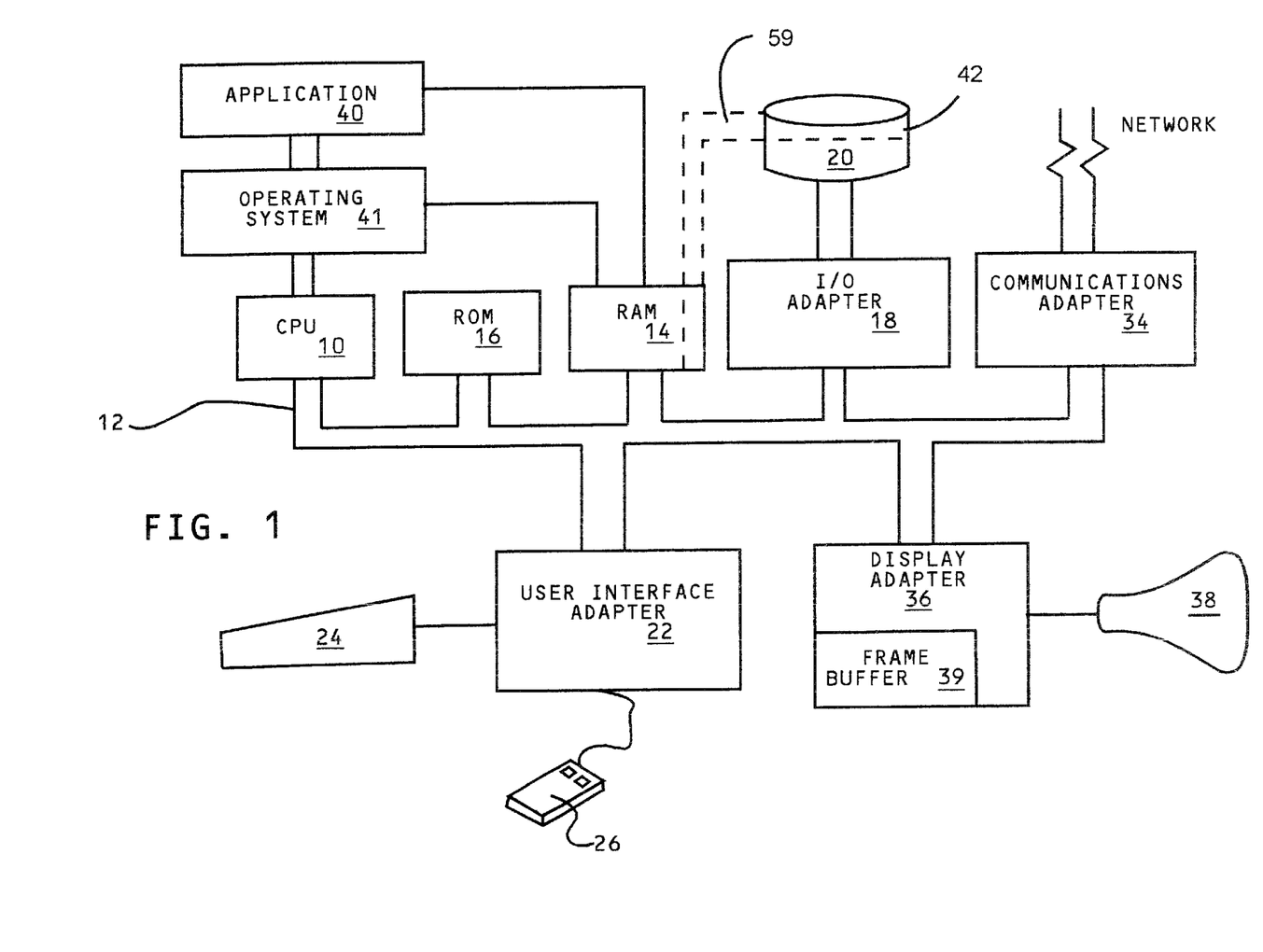
FIG. 1 is a block diagram of a data processing system including a central processing unit and network connections via a communications adapter which is capable of implementing the receiving display station on which the received Web document may be processed in accordance with the present invention.

Referring to FIG. 1, a typical data processing terminal is shown which may function as a basic computer controlled network receiving terminal used in implementing the present invention for tracking a sequence of received and cached Web documents and for controlling cache size. A central processing unit (CPU) 10, such as one of the PC microprocessors or workstations, e.g. RISC System/6000™ (RS/6000) (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system or OS/2™ operating system available from IBM (AIX 6000 and OS/2 are trademarks of IBM); Microsoft's Windows 98™ or Windows NT™, as well as UNIX and AIX operating systems. Application programs 40, controlled by the system, are moved into and out of the main memory RAM 14. These programs include the program of the present invention to be subsequently described in combination with any conventional Web browser, such as Netscape Communicator 3.0™ or Microsoft's Internet Explorer™. A read only memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or Wide Area Network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs for tracking cached received Web documents and controlling cache size according to the present invention. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38. The system also contains a memory cache 59, which is variable and sized in accordance with the present invention, which is illustrated as a dashed line outline and includes a portion 41 of disk drive 20 and a portion 42 of RAM 14.

Before going further into the details of specific embodiments, it will be helpful to understand from a more general perspective the various elements and methods which may be related to the present invention. Since a major aspect of the present invention is directed to documents, such as Web documents, transmitted over networks, an understanding of networks and their operating principles would be helpful. We will not go into great detail in describing the networks to which the present invention is applicable. Reference has also been made to the applicability of the present invention to a global network such as the Web. For details on the Web, objects and links, reference is made to the text, *Mastering the Internet*, G. H. Cady et al., published by Sybex Inc., Alameda, Calif., 1996. The Web is a global network of a heterogeneous mix of computer technologies and operating systems. Objects are linked to other objects in the Web through a variety of network server computers.

These network servers are the key to network distribution, such as the distribution of Web pages and related documentation including programs, applets or applications. In this connection, the term documents, as used to describe data transmitted over the Web or other networks, is intended to include Web pages including displayable text, graphics and other images. This displayable information may be still, in motion or animated, e.g. animated GIF images.

Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly pp. 637–642 on HTML in the formation of Web pages. In addition, aspects of this invention will involve Web browsers. A general and comprehensive description of browsers may be found in the above-mentioned *Mastering the Internet* text at pp. 291–313.

Figure 2:
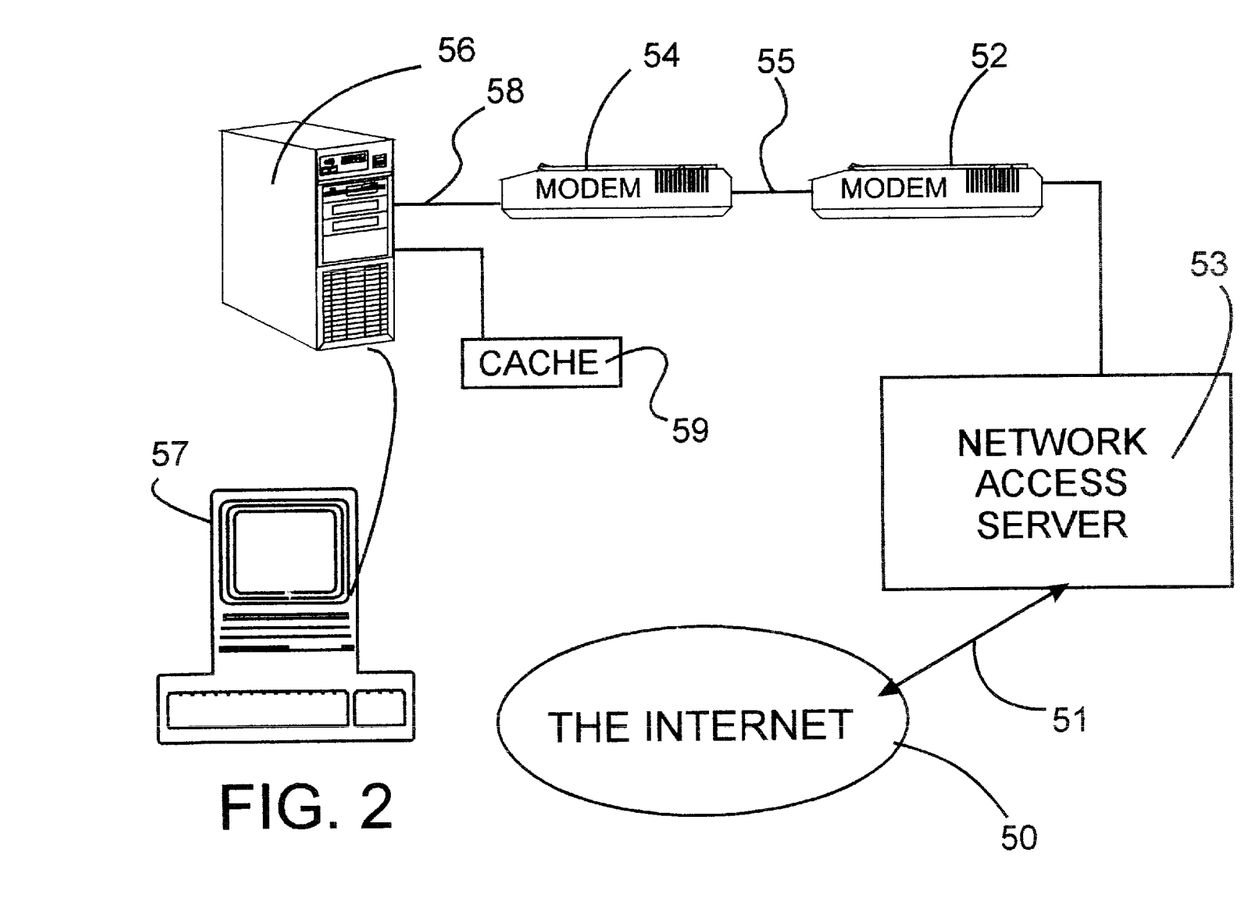
FIG. 2 is a generalized diagrammatic view of a Web portion upon which the present invention may be implemented.

A generalized diagram of a portion of the Internet, which the computer 56 controlled display terminal 57 used for Web page or other document display of the present invention, is connected as shown in FIG. 2. Computer 56 and display terminal 57 are the computer system shown in FIG. 1 and connection 58 (FIG. 2) is the network connection shown in FIG. 1. Reference may be made to the above-mentioned *Mastering the Internet*, pp. 136–147, for typical connections between local display workstations to the Internet via network servers, any of which may be used to implement the system on which this invention is used. The system embodiment of FIG. 2 is one of these known as a host-dial connection. Such host-dial connections have been in use for over 30 years through network access servers 53 which are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53, which may have accessed them from the Internet 50 via linkage 51. Cache 59, which serves the function of cache 59 also shown in the local display computer system described in FIG. 1, is just a local cache associated with the Web page receiving display. All standard browser programs are capable of local caching. While some form of caching is preferred, the manner of caching is not key to this invention. The user interactive graphical unit of the present invention for controlling cache size should be operable with all types of standard browser caches.

Figure 3:
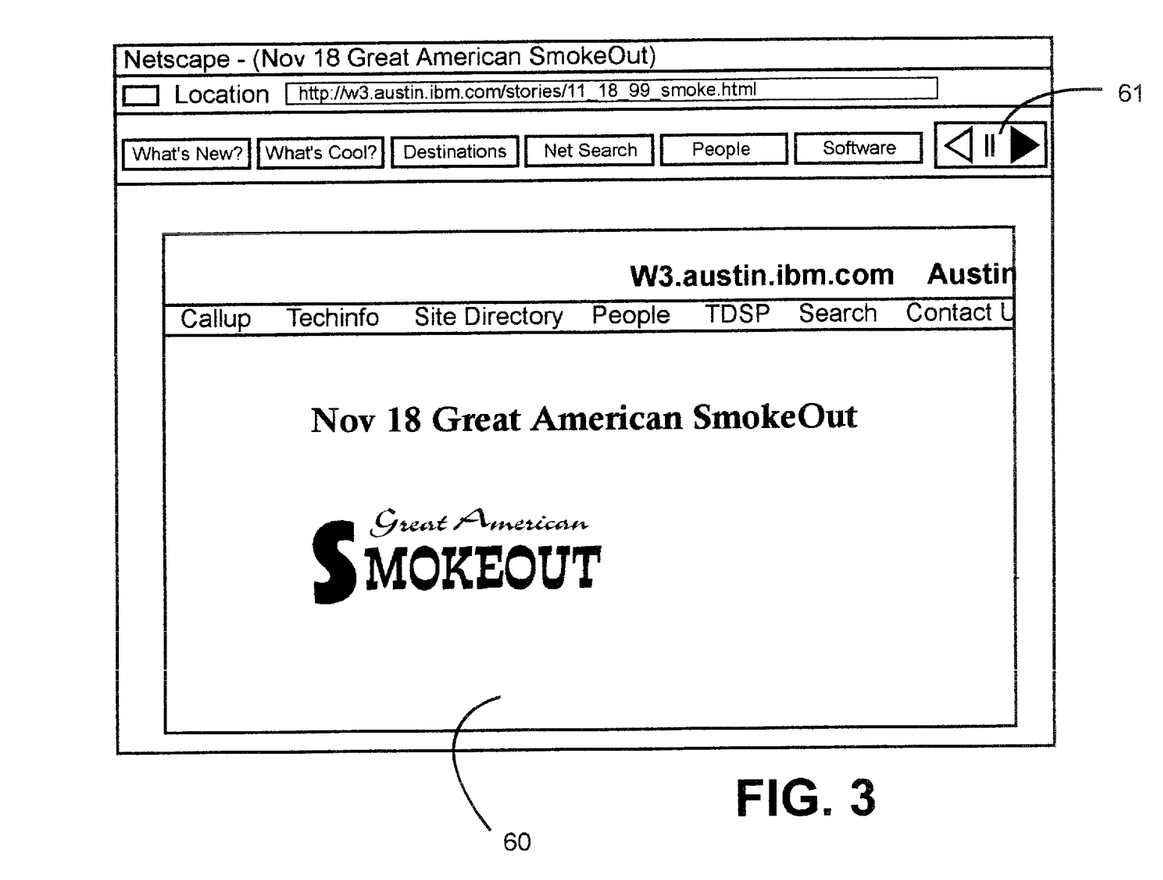
FIG. 3 is a diagrammatic view of a Web page user interface at a receiving station to illustrate the graphical unit of the present invention.

With reference to FIGS. 3 to 6, we will now describe some representative user interfaces for the processes of the present invention. The current or initial received Web page 60 is shown in FIG. 3 with the user interactive graphical unit or icon 61. It may conveniently be included in the function bar of the Web page frame provided by the Web browser interface. Then, with reference to the series of steps a through h in FIG. 4, there will be described how the present invention functions to track Web pages as they are received and cached. In step a, icon 61 is shown in the initial position of FIG. 3. The icon has a marker 67 which is depressed and represents the current or initial Web pages, and backward and forward scroll buttons 65 and 66; the latter are both in the inactive or depressed positions which indicates that there are no cached documents as yet which can be scrolled in either direction. The icon 61 also includes a pair 74 of cache sizing handles which will be subsequently described with respect to FIG. 6. In step b, the user has accessed the next Web page, e.g. by clicking on a hyperlink in the page of step a. As a result, the linked Web page becomes the current page represented by marker 67, and the previous page of step a becomes cached and, thus, represented by marker 68 which is raised to indicate that the page is available from the cache. Backward button 65 is raised to indicate that the user may also step back to marker 68 by pressing button 65. In the icon 61 of step c, the next linked Web page has been accessed; thus, there are now two cached previous Web pages represented by raised markers 68 and 69. So on in step d, three Web pages represented by markers 68, 69 and 70 are then cached. Now, note in step e, backward scroll button 65 has been depressed by user mouse controlled cursor 71 for one iteration which results in the graphical icon 61 arrangement of step f in which the previous page represented by now depressed marker 68 has become the current or home page which will be displayed as page 60 in FIG. 3, and there are now two pages, represented by markers 69 and 70 still cached in the backward direction and one page as represented by marker 67 cached in the forward direction. Thus, both scroll buttons 65 and 66 are now raised to indicate that scrolling may be done in both forward and backward directions. Accordingly, in step g, forward scroll button 66 has been depressed by user mouse controlled cursor 71 for one iteration which results in the graphical icon 61 arrangement of step h which is a return back to the icon arrangement of step d.

Now, with respect to FIG. 5, there will be described an illustration of how graphic control icon 61 is used to indicate size of cache, extent of cache filling and to change the cache size. In step 5a, the size of the cache is graphically indicated by space 73 between cache sizing handles 75. In step 5a, it appears that the markers 79 representing the stored documents have almost completely filled space 73 which indicates the cache is near full and should be expanded. The user then interactively grabs either of cache sizing handles 74, as indicated in FIG. 5b by double cursor 72, and moves handles 74 to the position shown in step 5c which results in an expanded space 73 in FIGS. 5c and 5d indicative of an enlarged cache. As set forth above, conventional browser programs provide for cache expansion based upon numeric user input. The present graphical icon provides an interactive graphical interface for such input.

Figure 6:
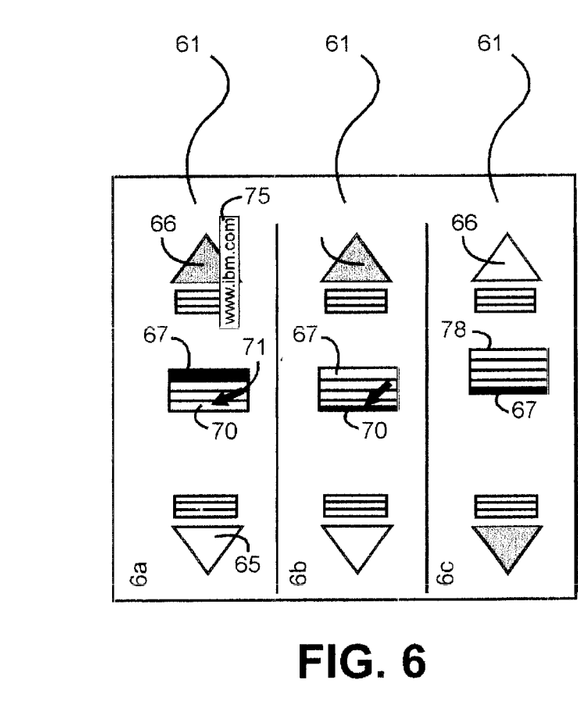
FIG. 6 is a diagrammatic view of the graphical unit of the present invention at a series of steps in the present process which illustrate marker identification.

FIG. 6 shows a simple process for identifying the Web pages or sequential documents represented by the markers and then optionally bringing back the identified pages. In step 6a, a marker 70 is pointed to by cursor 71 which results in the display of identifier 75 which could conveniently be the URL of the page. Then, the user may choose to click on the cached page represented by marker 70, step 6b, which in turn makes that page the current page represented by depressed marker 67, step 6c, and the previously current page as represented by marker 67 in step 6a is now cached three iterations away in the forward direction as represented by raised marker 78 in step 6c.

Figure 7:
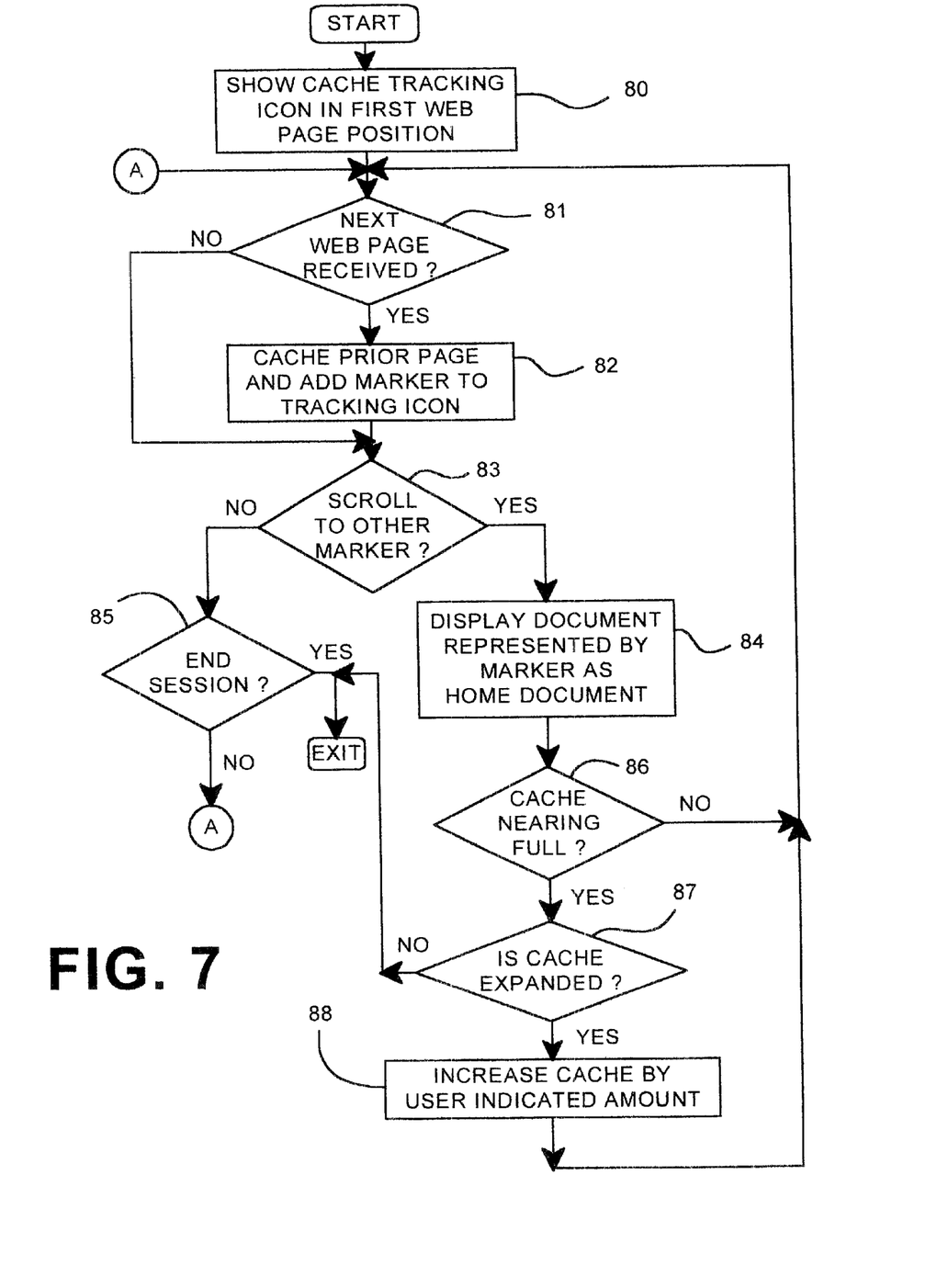
FIG. 7 is a flowchart of a run of an illustrative process in accordance with this invention.

Now with reference to FIG. 7, we will describe a simplified illustrative process according to the present invention. When the initial or next Web page is received, step 80, the icon 61 is set in the initial position shown in FIG. 4, step a. Then, step 81, the arrival of the next Web page is awaited (via hyperlink selection). If the decision from step 81 is Yes, a next Web page has been selected, then, step 82, then this next page becomes the active current or viewed page, the prior page is cached and a marker set up in the icon to represent this cached prior page. Then, after step 82 or if the decision from step 81 is No, a determination is made as to whether the user has moved to another marker, step 83. If the decision from step 83 is No, then a determination is made, step 85, as to whether we are at the end of the session. If Yes, then the session is exited. If No, then the process is returned to decision step 81 via branch "A", and the next Web page is awaited. If the decision from step 83 is Yes, another marker has been scrolled to, then the Web page or document represented by the marker is displayed as the home document, step 84 (e.g. the tracking icon 61 changes, as from steps e to f in FIG. 4). At this point, a determination may be conveniently made, step 86, as to whether the Web page cache is nearing its full capacity, step 86. If No, then the process is returned to step 81, and the next Web page is awaited. If the decision from step 86 is Yes, the cache is near full, then a determination is made, step 87, as to whether the user has expanded the cache, e.g. via icon 61, handles 74, FIG. 5. If No, then the session should be considered complete at this point and exited. If the determination from step 87 is Yes, the cache has been expanded by the user, then, step 88, the cache storage capacity is expanded by an amount proportional to the amount represented by the amount of handle 74 movement in FIG. 5, and the process is returned to step 81, and the session is continued.

Figure 4:
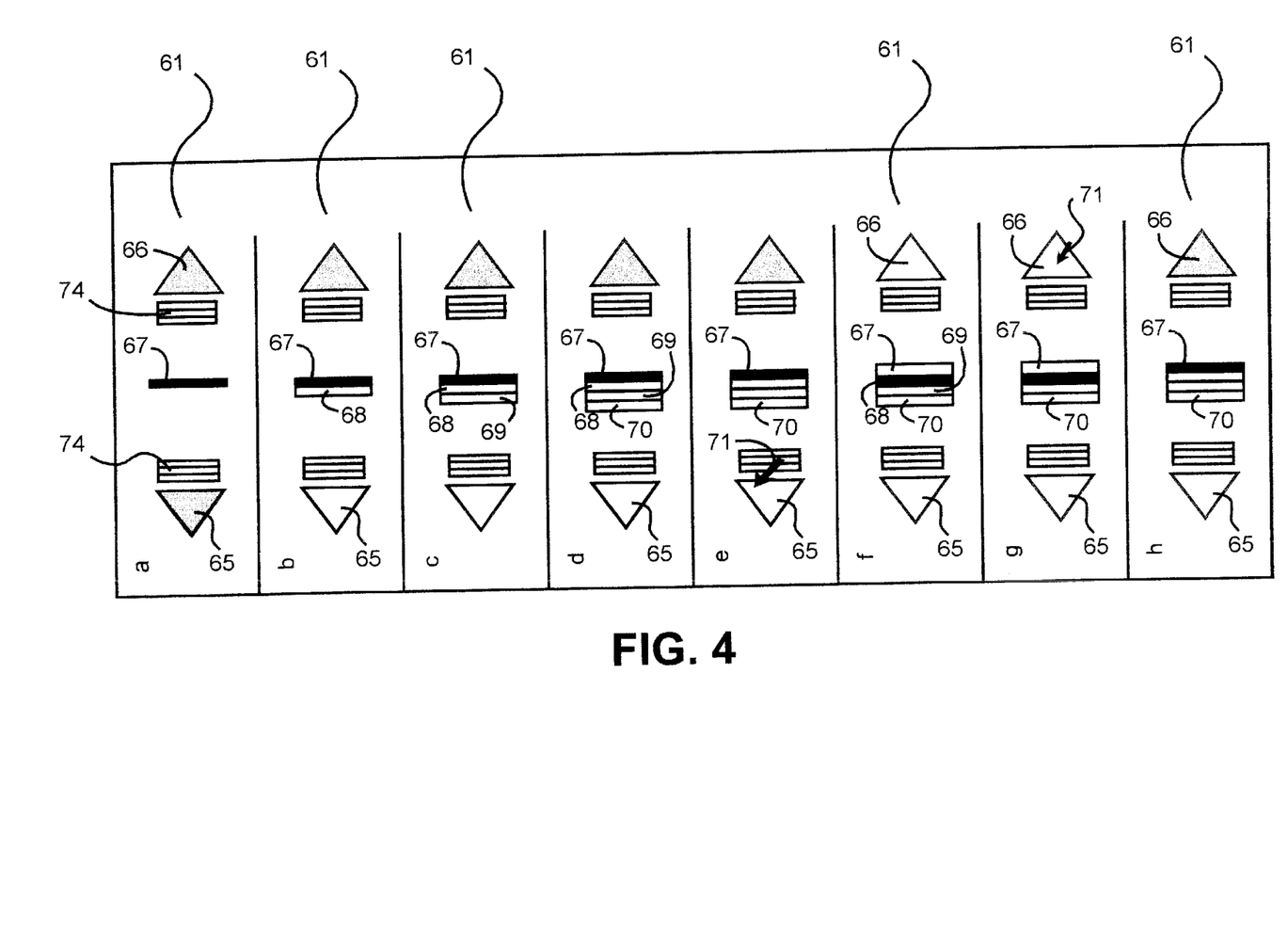
FIG. 4 is a diagrammatic view of the graphical unit of the present invention shown in FIG. 3 at a series of steps in the present process.
Figure 5:
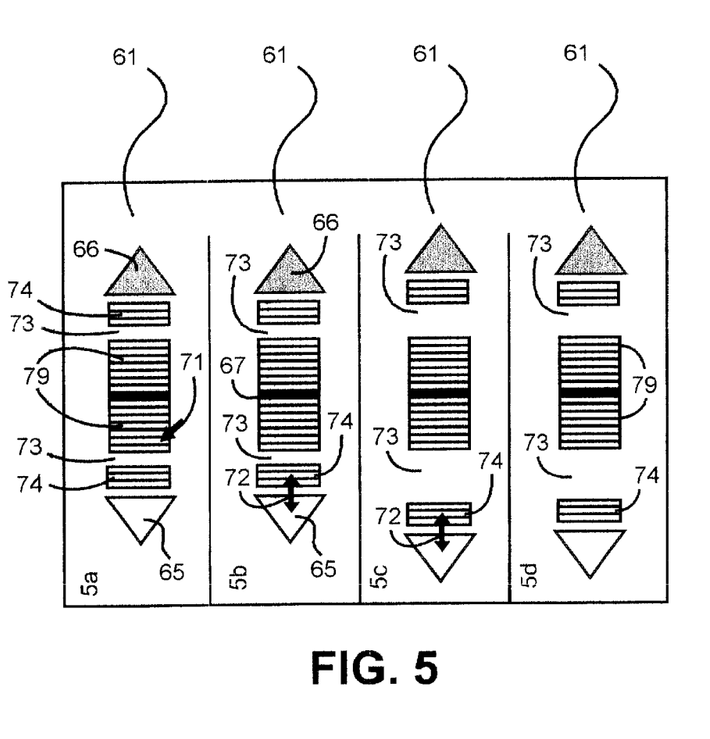
FIG. 5 is a diagrammatic view of the graphical unit of the present invention at a series of steps in the present process used in controlling cache size.

For simplicity of illustration in the diagrams of FIGS. 4 through 6, the markers representative of the respective Web pages have all been shown to be of the same width on icon 61 irrespective of the size of the Web document represented. It will be understood that Web documents may vary considerably in size and content, and, thus, cache storage space which they will consume area 73 in icon 61, FIG. 5, the markers 79 may be varied in width with the size of the documents which they represent. For example, as mentioned above, many Web pages are received with some indication of the size of the documents in bytes, or the size may be readily determined through the browser. A routine may be set up, if desired, to vary the widths of markers 79 to match the sizes of the documents which they represent. In such a case, they will still provide the user with an indication of when handles 74 are being approached by markers 79.

The illustrative embodiments hereinabove have involved Web document tracking. However, the present invention is applicable to the tracking of any data processor controlled events and particularly to tracking of computer controlled events accessed by the tracking computer which have slow access times relative to the processing capabilities of the processing computer, e.g. data events moved from slower to faster storage, tape to disk or disk to RAM or from extended to current data storage.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Although certain preferred embodiments have been shown and described, it will be understood that many changes and modifications may be made therein without departing from the scope and intent of the appended claims.

What is claimed is:

1. A data processor controlled display system with a graphical user interface comprising:
   means for tracking a sequence of data processor controlled events, and
   a displayed graphical unit including:
      a sequence of non-descriptive markers corresponding to said sequence of events, and
      user interactive means for stepping sequentially through said sequence of markers.

2. The data processor controlled display system of claim 1 further including:
   means for selecting one of said markers, and
   means responsive to said selecting means for displaying a description of the event represented by the marker.

3. The data processor controlled display system of claim 1 further including:
   means for selecting one of said markers, and
   means responsive to said selecting means for displaying the event corresponding to the selected marker.

4. The data processor controlled display system of claim 3 wherein said selecting means include pointing means.

5. The data processor controlled display system of claim 3 wherein said selecting means include said means for stepping.

6. A World Wide Web (Web) communication network comprising:
   a data processor controlled receiving display station for receiving Web documents including:
      means for storing a sequence of received Web documents,
      means for tracking said sequence of stored Web documents, and
      a displayed graphical unit including:
         a sequence of non-descriptive markers corresponding to said sequence of stored Web documents, and
         user interactive means for stepping sequentially through said sequence of markers.

7. The Web communication network of claim 6 further including:
   means for selecting one of said markers, and
   means responsive to said selecting means for displaying the Web document corresponding to the selected marker.

8. The Web communication network of claim 7 wherein said selecting means include pointing means.

9. The Web communication network of claim 7 wherein said selecting means include said means for stepping.

10. The Web communication network of claim 6 wherein said storing means comprise cache means of variable size, and
   said graphical unit further includes interactive means for varying said cache size.

11. The Web communication network of claim 10 wherein said graphical unit further comprises a space for said sequence of markers proportional in size to the size of said cache means, and
   said means for varying said cache size vary the size of said space for said sequence of markers.

12. In a data processor display system, a method for controlling a sequence of data processor controlled events on a graphical user interface comprising:

tracking a sequence of data processor controlled events, and displaying a graphical unit including:
- displaying a sequence of nondescriptive markers corresponding to said sequence of events, and
- enabling a user to interactively step sequentially through said sequence of markers.

13. The method of claim 12 further including the steps of:

selecting one of said markers, and displaying a description of the event represented by the marker responsive to said selecting step.

14. The method of claim 12 further including steps of:

selecting one of said markers, and displaying the event corresponding to the selected marker responsive to said selecting step.

15. The method of claim 14 wherein said selecting step is done by pointing means.

16. The method of claim 14 wherein said selecting is done through said stepping through said markers.

17. In a Web communication network, a method for controlling a sequence of received Web documents at a data processor controlled receiving display station comprising:

storing a sequence of received Web documents, tracking said sequence of stored Web documents, and displaying a graphical unit including:
- displaying a sequence of nondescriptive markers corresponding to said sequence of stored Web documents, and
- enabling a user to interactively step sequentially through said sequence of markers.

18. The method of claim 17 further including:

selecting one of said markers, and displaying the Web document corresponding to the selected marker responsive to said selecting step.

19. The method of claim 18 wherein said selecting step is done by pointing means.

20. The method of claim 19 wherein said selecting step is done by stepping through said markers.

21. The method of claim 17 wherein said storing step includes caching said Web documents in a variable size cache, and further including the step of enabling the user to interactively vary said cache size.

22. The method of claim 21 wherein the user is enabled to vary the cache size through steps including:

providing a space for said sequence of markers in said graphical unit proportional in size to the size of said cache, and enabling the user to varying said cache size by varying the size of said space for said sequence of markers.

23. A computer program having code recorded on a computer readable medium for controlling a sequence of data processor controlled events through the graphical user interface of a data processor controlled display system comprising:

means for tracking a sequence of data processor controlled events, and a displayed graphical unit including:
- a sequence of nondescriptive markers corresponding to said sequence of events, and
- user interactive means for stepping sequentially through said sequence of markers.

24. The computer program of claim 23 further including:

means for selecting one of said markers, and means responsive to said selecting means for displaying a description of the event represented by the marker.

25. The computer program of claim 23 further including:

means for selecting one of said markers, and means responsive to said selecting means for displaying the event corresponding to the selected marker.

26. The computer program of claim 25 wherein said selecting means include pointing means.

27. The computer program of claim 25 wherein said selecting means include said means for stepping.

28. A computer program having code recorded on a computer readable medium for controlling a sequence of received Web documents at a data processor controlled receiving display station in a Web communication network comprising:

means for storing a sequence of received Web documents, means for tracking said sequence of stored Web documents, and a displayed graphical unit including:
- a sequence of nondescriptive markers corresponding to said sequence of stored Web documents, and
- user interactive means for stepping sequentially through said sequence of markers.

29. The computer program of claim 28 further including:

means for selecting one of said markers, and means responsive to said selecting means for displaying the Web document corresponding to the selected marker.

30. The computer program of claim 29 wherein said selecting means include pointing means.

31. The computer program of claim 29 wherein said selecting means include said means for stepping.

32. The computer program of claim 28 wherein said storing means comprise cache means of variable size, and said graphical unit further includes interactive means for varying said cache size.

33. The computer program of claim 32 wherein said graphical unit further comprises a space for said sequence of markers proportional in size to the size of said cache means, and said means for varying said cache size vary the size of said space for said sequence of markers.

* * * * *